F. HUMPHRIS.
CONSTRUCTION OF ADJUSTABLE SPANNERS, WRENCHES, CLAMPS, PIPE CUTTERS, PIPE GRIPS, AND THE LIKE.
APPLICATION FILED JULY 17, 1919.
1,393,534.
Patented Oct. 11, 1921.
2 SHEETS—SHEET 2.
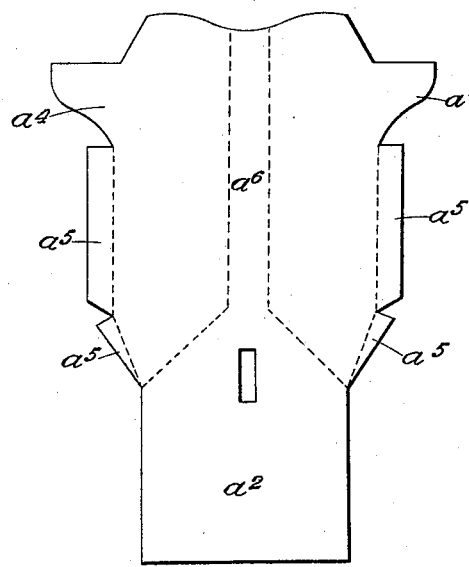
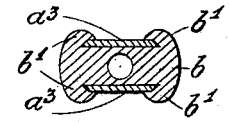
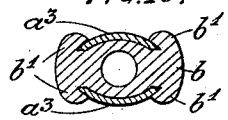
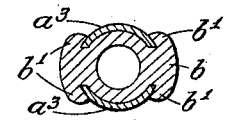
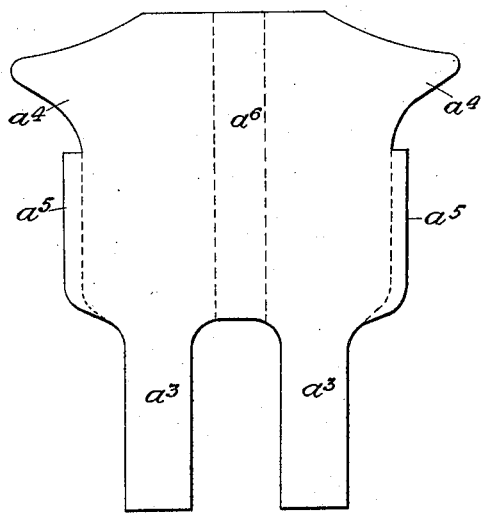
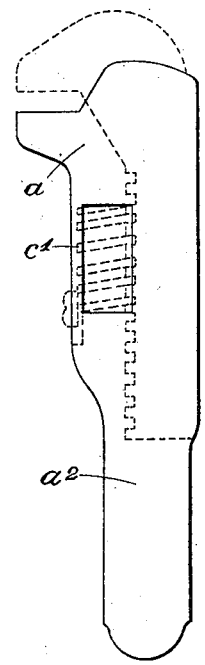
WITNESSES
INVENTOR
Frank Humphris
By James L. Norris
ATTORNEY

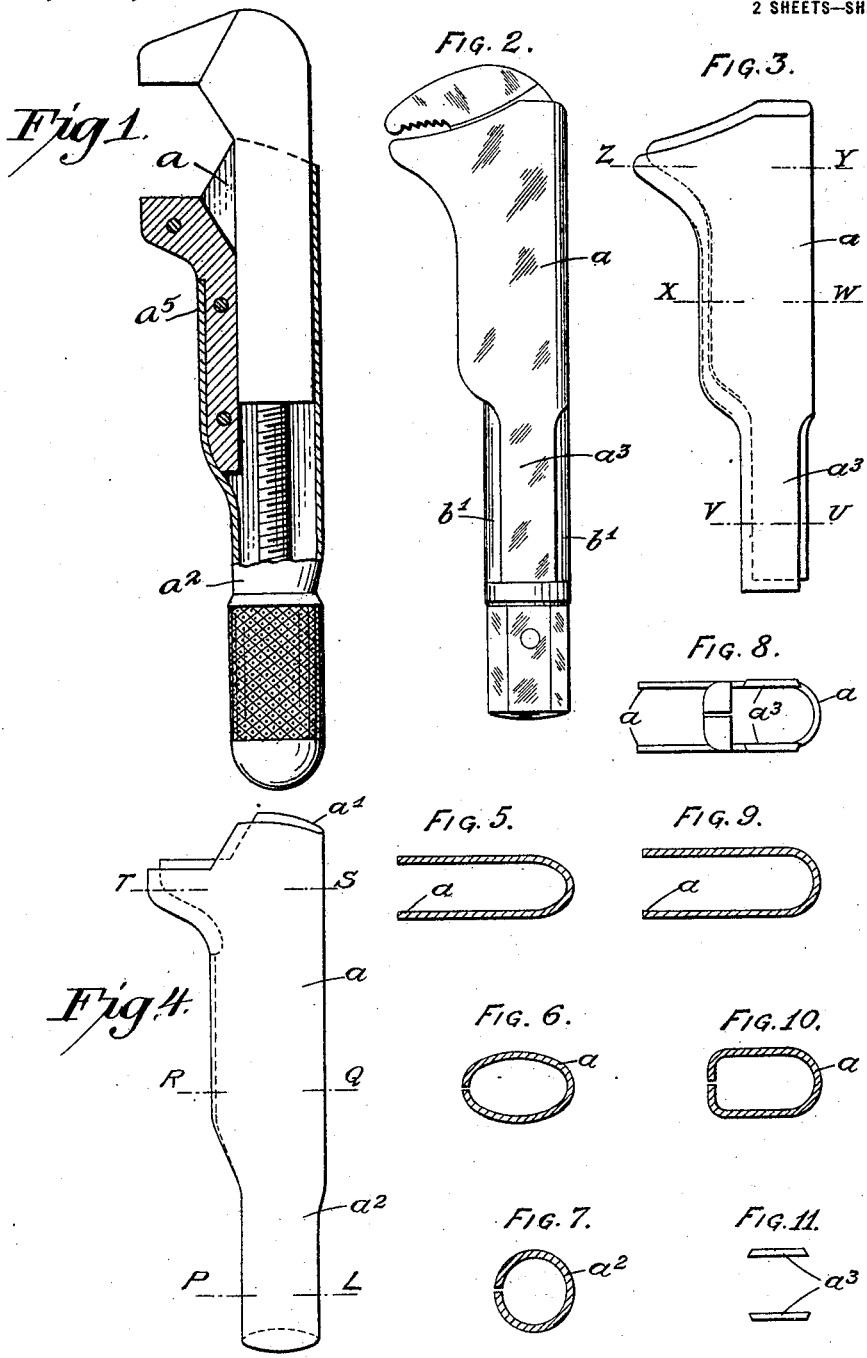

UNITED STATES PATENT OFFICE.

FRANK HUMPHRIS, OF BOSCOMBE, ENGLAND.

CONSTRUCTION OF ADJUSTABLE SPANNERS, WRENCHES, CLAMPS, PIPE-CUTTERS, PIPE-GRIPS, AND THE LIKE.

1,393,534.     Specification of Letters Patent.     Patented Oct. 11, 1921.

Application filed July 17, 1919. Serial No. 311,676.

(GRANTED UNDER THE PROVISIONS OF THE ACT OF MARCH 3, 1921, 41 STAT. L., 1313.)

*To all whom it may concern:*

Be it known that I, FRANK HUMPHRIS, a subject of the King of Great Britain, residing at Boscombe, England, have invented a new and useful Improved Construction of Adjustable Spanners, Wrenches, Clamps, Pipe-Cutters, Pipe-Grips, and the like, (for which I have filed an application in England, September 18, 1917, No. 13364,) of which the following is a specification.

The present invention relates to the construction of adjustable spanners, wrenches, clamps, pipe-cutters, pipe-grips and similar tools and its object is to provide an outer shell or body for the tool which is simple and cheap to produce and yet very efficient and strong for the purpose it is designed for.

According to the said invention the shell or body is produced by outcutting a blank from sheet metal and then bending or forming the blank to the desired shape and joining the edge parts thereof where they abut by welding, brazing or the like.

The chief fixed parts of the tool may be secured to the shell or body by spot or other welding processes or by rivets or otherwise and the chief operable parts controlling the movable jaws or the like are mounted in or on the said shell or body so that they may slide or turn as the case may be.

Further features of the said invention consist in providing projecting parts in a shell or body produced as described between which the fixed jaw is secured; parts to provide additional gripping faces adjacent to the fixed jaw; parts for bending around and joining together at the jaw opening edge of the tool and parts for accommodating the handle or the screw device for controlling the movable jaw of the tool.

In order that the said invention may be clearly understood and readily carried out it is hereinafter described with reference to the accompanying drawings in connection with adjustable spanners, and pipe wrenches but it is to be understood that the invention is applicable to pipe-cutters and other similar tools and the embodiments illustrated are given by way of example.

In the said drawings:

Figure 1 is a sectional side elevation of one form of an adjustable spanner provided with an outer shell or body made according to this invention.

Fig. 2 is a side view of another form of an outer shell or body made according to the said invention, in this case forming part of an adjustable pipe-wrench.

Fig. 3 is a side view of the outer shell or body employed on the adjustable pipe-wrench shown in Fig. 2.

Fig. 4 is a side view of the outer shell or body employed on the adjustable spanner shown in Fig. 1.

Fig. 5 is a cross-sectional view taken on the line T. S. Fig. 4.

Fig. 6 is a cross-sectional view taken on the line R. Q. Fig. 4.

Fig. 7 is a cross-sectional view taken on the line P. L. Fig. 4.

Fig. 8 is an underside or end view of Fig. 3 viewed from the bottom of that figure.

Fig. 9 is a cross-sectional view taken on the line Z. Y. Fig. 3.

Fig. 10 is a cross-sectional view taken on the line X. W. Fig. 3.

Fig. 11 is a cross-sectional view of Fig. 3 taken on the line V. U. Fig. 3.

Fig. 12 is a face view of an outcutting, blank or stamping of the metal part provided and employed for constructing the shell or body shown in Fig. 4, before folding or bending it to shape.

Fig. 13 is a face view of an outcutting, blank or stamping of the metal part provided and employed for constructing the body shown in Fig. 3, before folding or bending it to shape.

Fig. 14 is a cross-sectional view taken on the line V. U. Fig. 3 and assuming that the hollow perforated packing used in this form of body is in place and also cross-sectioned.

Fig. 15 shows a modification of Fig. 14.

Fig. 16 shows another modification of Fig. 14.

Fig. 17 is a side view of an outer shell or body of an adjustable tool, made according to the methods employed in the construction of the devices shown in Figs. 3 and 4 but with perforations therethrough for accommodating a known method of adjusting nut.

In the following description the same letters of reference refer to like parts throughout the drawings.

In one embodiment of the said invention, shown by Figs. 1, 4, 5, 6, 7 and 12, the shell or body $a$ for any of the before-mentioned tools is formed in such a manner that when taken or viewed in cross-section to its axis it has in one form of construction a channel or U-form at the end where the jaws of spanners, pipe-grips, wrenches or like tools are located, while at the other end $a^2$ or that one remote from the jaw-end (and for a portion of a length of the tool sufficient to form a handle or to accommodate a rotatably mounted sleeve or long hollow-controlling nut thereon) the shell or body $a$ is preferably of tubular form, either circular in cross section as at $a^2$ or elliptical in cross-section.

In a modified form the said shell or body $a$, as shown by Figs. 2, 3 and 13, has the same channel or U-form at the jaw-end provided for the same purposes as before-mentioned, but its other end instead of being circular or elliptical in cross-section, represents two strip parts $a^3$ at a distance apart and of a length approximately the same as the vertical sides of the U or channel form. Between these two strip parts $a^3$ a hollow perforated packing or connecting-piece $b$ is secured by rivets, dovetailing or other suitable means and serves to provide a pad for the hand, being so formed in cross-section that it constitutes a handle in conjunction with the strips $a^3$ it is secured to, which are part of the body or shell $a$ of the device. The said connecting or packing-piece $b$ is preferably formed with rounded edges, or beads $b'$ or it is of dumb-bell form when viewed in cross-section to the axis of the tool.

Preferably the body or shell $a$ of the device is made by producing outcuttings or blanks $a^6$ from sheet metal and folding to the desired U or channel form at the one end and to the circular or elliptical form at the other, and then joining the circularly formed part $a^2$ or elliptically formed part where the edges of the originally flat metal sheet $a$ abut by means of welding or brazing. It will be obvious, however, that various modifications of the shape of the outer shell or body will be necessary to meet the requirements of the different purposes to which the tool will be put to or is designed for. In Figs. 12 and 13 of the drawings it will be seen by the dotted lines approximately where the two examples of outcutting or blanks $a^6$ illustrated are folded or bent to give them their ultimate form.

Upon these outcuttings or blanks $a^6$ ears, lugs, or projecting parts $a^5$ (see Fig. 12) are formed for the purpose of folding around, to give that edge or face of the body $a$ remote from the bottom, its U form. The said outcuttings or blanks are when necessary formed with rectangularly formed perforations $c$ or $c'$ the former one $c$ (see Fig. 12) to accommodate a locking device and the latter one $c'$ (see Fig. 17) to accommodate the ordinary adjusting nut used in various kinds of adjustable tools which are suited to the employment of the body $a$ as one of their component parts. The fixed jaw of the tool is secured or anchored by welding, brazing or the like between the projections or parts $a^4$ of the outcutting $a^6$ and in the case of spanners the shell or body is preferably so shaped above these parts that the edges of the shell or body adjacent thereto form faces at an angle to the face of the fixed jaw (see Figs. 4, 12 and 17); the movable jaw also has an angular face adjacent to its main face. These additional faces are at 120° to the main gripping faces of the jaws, and therefore the tool may be engaged with four sides of any hexagonal screw nut.

It will be obvious that certain slight modifications on the actual sectional or other shapes will be necessary to provide suitable shells or bodies for the varying kinds of tools that this invention may be used in connection with, without departing from the spirit of the said invention.

What I claim is:—

1. In a device of the class specified, a metal shell of U-shaped form with one extremity wider than the other, the wider extremity having lateral jaw-engaging projections, the shell forming inclosing means and having a fixed jaw secured between the said projections, the fixed jaw having a shank extending materially into the shell toward its narrow extremity and closely fitting against the front portion thereof, the narrower extremity of the shell having handle means secured to its extremity, a slidable jaw having a shank mounted between the rear edge of the shank of the fixed jaw and the rear wall of the shell, the shank of the slidable jaw also having an operating device extending therefrom, and means associated with the handle means for operating the said slidable jaw, the depending shank of the fixed jaw bracing the front portion of the shell and serving as a guiding bearing for contact therewith of the front edge of the shank of the slidable jaw.

2. In a device of the class specified, a body comprising a metal shell of U-shaped form having one extremity wider than the other and provided with parallel laterally extending jaw-engaging projections, the shell providing inclosing means and having a fixed jaw secured between the jaw projections, the said projections extending fully over opposite sides of the fixed jaw and each having an edge flush with the working face of the jaw to increase the support and resistance of the latter jaw, the narrower extremity of the shell being provided with a tubular hand-gripping means and having the opposite side edges of the parts of said narrower extremity embedded and secured in said hand gripping means, a slidable jaw movable between the fixed jaw and the back portion of the shell and having a shank inclosed by the shell and operating through the said hand-gripping means, and means for operating the said slidable jaw.

FRANK HUMPHRIS.

Witnesses:
 ERNEST ZAPPERT,
 GEORGE HARRISON.